United States Patent
Coffey et al.

(10) Patent No.: US 6,950,260 B2
(45) Date of Patent: Sep. 27, 2005

(54) THERMALLY ASSISTED MAGNETIC RECORDING SYSTEM AND METHOD OF WRITING USING MAGNETIC AND THERMAL GRADIENTS

(75) Inventors: Kevin Robert Coffey, Morgan Hill, CA (US); Robert Edward Fontana, Jr., San Jose, CA (US); Jan-Ulrich Thiele, Menlo Park, CA (US)

(73) Assignee: Hitachi Global Technologies Netherlands B.V., Amsterdam (NL)

(*) Notice: Subject to any disclaimer, the term of this patent is extended or adjusted under 35 U.S.C. 154(b) by 276 days.

(21) Appl. No.: 09/874,673

(22) Filed: Jun. 4, 2001

(65) Prior Publication Data

US 2002/0191320 A1 Dec. 19, 2002

(51) Int. Cl.$^7$ .............................................. G11B 27/36
(52) U.S. Cl. ...................................... 360/59; 369/13.24
(58) Field of Search ............................ 360/59, 319, 55, 360/78.04, 114.01, 31, 313, 317, 318, 131, 135; 369/13.01, 13.14, 13.24, 13.13; 428/694 ML, 694 TM; 372/43, 49

(56) References Cited

U.S. PATENT DOCUMENTS

| | | | |
|---|---|---|---|
| 5,025,430 A | | 6/1991 | Takokoro et al. |
| 5,530,685 A | | 6/1996 | Katayama et al. |
| 5,625,617 A | | 4/1997 | Hopkins et al. |
| 5,889,641 A | | 3/1999 | Belser et al. |
| 5,986,978 A | | 11/1999 | Rottmayer et al. |
| 6,016,290 A | * | 1/2000 | Chen et al. .............. 369/13.17 |
| 6,130,779 A | | 10/2000 | Carlson et al. |
| 6,317,280 B1 | * | 11/2001 | Nakajima et al. ............. 360/59 |
| 2002/0192506 A1 | * | 12/2002 | Coffey et al. ........ 428/694 TM |

OTHER PUBLICATIONS

A. Partovi et al., High–Power Laser Light For Near–Field Optics and Its Application to High–Density Optical Data Storage, Sep. 13, 1999, vol. 75, No. 11, pp. 1515–1517.
A. Partov, Optical Near–Field Aperture Storage Technique(ONFAST) For High Density, High Performance Storage Applications, Jul. 1999, SPIE vol. 3864, pp. 352–354.
D. Weller et al., High Ku Materials Approach to 100 Gbit/In$^2$, Jul. 9, 1999, pp. 1–6.

* cited by examiner

*Primary Examiner*—Alan T. Faber
(74) *Attorney, Agent, or Firm*—Lewis L. Nunnelley; William D. Gill (57) ABSTRACT

A magnetic recording system is provided having a write head employing a combination of magnetic write field gradient and thermal gradient to write data on a 'thermal spring' magnetic recording media. The write head comprises a magnetic element using a write current to induce a magnetic write field at the magnetic media and a thermal element using a very small aperture laser to heat a portion of the media. The thermal spring magnetic media comprises [comprises] first and second stacks providing two exchange coupled ferromagnetic layers having different Curie temperatures [The first stack has a high magneto-crystalline anisotropy, a relatively low saturation magnetization and a low Curie temperature.] [The second stack has a relatively low magneto-crystalline anisotropy, a high saturation magnetization and a high Curie temperature.] The magnetic field gradient and the thermal gradient are arranged to substantially overlap at the trailing edge of the heated portion of the magnetic media allowing data at high density with high thermal stability to be recorded on the rapidly cooling thermal spring magnetic recording media.

13 Claims, 12 Drawing Sheets

THERMALLY ASSISTED MAGNETIC RECORDING SYSTEM AND METHOD OF WRITING USING MAGNETIC AND THERMAL GRADIENTS

CROSS REFERENCE TO RELATED APPLICATION

U.S. patent application Ser. No. 09/874,100, entitled 'THERMAL SPRING' MAGNETIC RECORDING MEDIA FOR WRITING USING MAGNETIC AND THERMAL GRADIENTS, was filed on the same day and owned by a common assignee.

BACKGROUND OF THE INVENTION

1. Field of the Invention

The present invention relates to magnetic recording systems for writing information signals on a magnetic medium and, in particular, to a magnetic recording system employing a combination of magnetic write field gradient and thermal gradient to increase the areal density of magnetic recording, and to a 'thermal spring' magnetic recording media for recording information with such systems.

2. Description of the Related Art

Moving magnetic storage devices, especially magnetic disk drives, are the memory device of choice. This is due to their expanded non-volatile memory storage capability together with a relatively low cost. Thin film magnetic read/write heads are used for reading and writing magnetically coded data stored on a magnetic storage medium such as a magnetic disk.

Magnetic disk drives are information storage devices which utilize at least one rotatable magnetic media disk having concentric data tracks defined for storing data, a read/write transducer for reading data from and/or writing data to the various data tracks, a slider for supporting the transducer adjacent the data tracks typically in a flying mode above the storage media, a suspension assembly for resiliently supporting the slider and the transducer over the data tracks, and a positioning actuator coupled to the transducer/slider/suspension combination for moving the transducer across the media to the desired data track and maintaining the transducer over the data track center line during a read or a write operation. The transducer is attached to or is formed integrally with the slider which supports the slider above the data surface of the storage disk by a cushion of air, referred to as an air bearing, generated by the rotating disk.

There is a continuing strongly-felt need for increasing the data storage density in the magnetic media of the storage disks. Most efforts to increase magnetic storage density involve techniques for increasing the areal bit density in the magnetic storage medium. In rotating magnetic disk drives, the areal density is the product of the number of flux reversals, or bits, per unit length along a data track and the number of tracks available per unit length of disk radius. In current high areal density storage systems the bit density is in the range of $300$–$500 \times 10^3$ bits/inch and the track density is in the range of $20$–$36 \times 10^3$ tracks/inch resulting in an areal density of about $10$–$18$ Gbits/in$^2$. Advances to areal densities of $40$–$100$ Gbits/in$^2$ are probably achievable with the prior art technology by implementing careful control of media microstructure in order to ensure thermal stability of the stored data and to keep media noise within acceptable limits.

However, there is a problem with the prior art magnetic recording systems and the magnetic media as areal density is further increased to densities greater than about $100$ Gbits/in$^2$. As the track density increases, it becomes increasingly difficult to maintain the transducer centered over the very narrow data track during read and write operations. As the bit density along the track increases, a more fundamental problem arises due to the small size of the bits causing instability of the bit magnetization due to thermal fluctuations. As the bit size decreases, the energy of thermal fluctuations becomes comparable to the stored magnetic energy which is given by the product of the switching volume and the magneto-crystalline anisotropy of the material. This results in a decay of the bit magnetization and loss of the stored data.

Therefore, there is a need for a magnetic recording system that provides increased areal density of data with improved thermal stability and for a method of writing data on high areal density magnetic media in such a magnetic recording system.

SUMMARY OF THE INVENTION

It is an object of the present invention to disclose a magnetic recording system employing a combination of magnetic write field gradient and thermal gradient to write data on a magnetic recording disk.

It is another object of the present invention to dislose a magnetic recording system combining a magnetic write field gradient and a thermal gradient to write data on a magnetic disk having a high magneto-crystalline anisotropy resulting in an increased areal recording density.

It is yet another object of the present invention to disclose a magnetic recording system combining a magnetic write field gradient and a thermal gradient to write data on a magnetic disk, wherein the magnetic write field gradient and the thermal gradient are spatially and temporally coincident on the write area of the magnetic disk during the write operation.

It is still another object of the present invention to disclose a 'thermal spring' magnetic recording medium for writing data at high areal density using a magnetic write field gradient combined with a thermal gradient.

It is a further object of the present invention to disclose a method of writing data at high areal density with a combined magnetic write field gradient and a thermal gradient.

In accordance with the principles of the present invention, there is disclosed a magnetic recording system having a write head comprising a magnetic element and a thermal element and a magnetic recording disk including a thermal spring magnetic recording media. The thermal spring magnetic recording media comprises first and second stacks providing two exchange coupled ferromagnetic layers having different Curie temperatures. The first stack has a high magneto-crystalline anisotropy and a low Curie temperature. The second stack has a relatively low magneto-crystalline anisotropy, a high saturation magnetization and a high Curie temperature.

The write head comprises a magnetic element for providing a magnetic field gradient at the magnetic recording medium and a thermal element for providing a thermal gradient at the magnetic recording medium spatially and temporally coincident with the magnetic field gradient. The thermal element is a very small aperture laser (VSAL), a solid state laser device having a very small aperture in a metallic reflector layer for emitting a pulse of high intensity light through a write gap of the magnetic element. Alternatively, continuous wave (cw) light may be used for very thin or well heat sunk magnetic media for which the cooling rate after the heat source passes through is sufficiently high. The magnetic element comprises the metallic reflective layer of the VSAL electrically insulated from the solid state laser by a dielectric layer. A write current pulse is directed through the metallic reflective layer perpendicular to the direction of motion of the magnetic media relative to the read/write head to produce a magnetic field pulse with the field extending into the region between the the aperture and the magnetic media. Alternatively, the magnetic element may be a inductive write head having first and second ferromagnetic pole pieces separated by a write gap and magnetically coupled at a back gap and a conductive coil for inducing a magnetic field flux in the pole pieces resulting in a magnetic field gradient at the write gap. The pulse of light from the VSAL impinges on and is absorbed by the magnetic media resulting in rapid heating of the magnetic media in the write gap region. As the magnetic media moves relative to the write gap, a thermal gradient at the trailing edge of the heated spot in the magnetic media is coincident spatially and temporally with the magnetic field gradient in the media generated by the write current pulse.

The magnetic field gradient provided by the write current pulse will be steepest in the vicinity of the trailing edge of the light aperture. While the width of the write track is mainly defined by the size and shape of the aperture, that is, by the temperature profile and gradient created by the light spot, the transition length is defined by the overlapping thermal and magnetic field gradients. In this region of overlapping thermal and magnetic field gradients, the coercivity of the magnetic media is thermally reduced sufficiently to allow switching of the magnetization by the magnetic field gradient followed by rapid cooling back to the high coercivity state due to the steep thermal gradient and the motion of the media.

To avoid thermal instabilities of the stored magnetic data, a minimal stability ratio of stored magnetic energy $K_U V$ to thermal energy $k_B T$ of $K_u V/k_B T$ of about 60 is required, where $K_U$ is the magneto-crystalline anisotropy of the magnetic media, V is the magnetic switching volume, $k_B$ is the Boltzmann constant and T is the temperature of the media. Having successfully switched the magnetic media by heating the transition region so as to exceed its write energy threshold, it is necessary to rapidly cool the transition region in order to prevent thermal instabilities from degrading the new magnetization state. By arranging to substantially overlap the trailing edges of the temperature and magnetic field gradients produced by the VSAL light pulse and the write current pulse through the metallic reflective layer, respectively, the transition region cools by diffusive processes sufficiently rapidly to maintain its magnetization.

The above, as well as additional objects, features and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

DETAILED DESCRIPTION OF THE PREFERRED EMBODIMENT

The following description is the best embodiment presently contemplated for carrying out the present invention. This description is made for the purpose of illustrating the general principles of the present invention and is not meant to limit the inventive concepts claimed herein.

Figure 1:
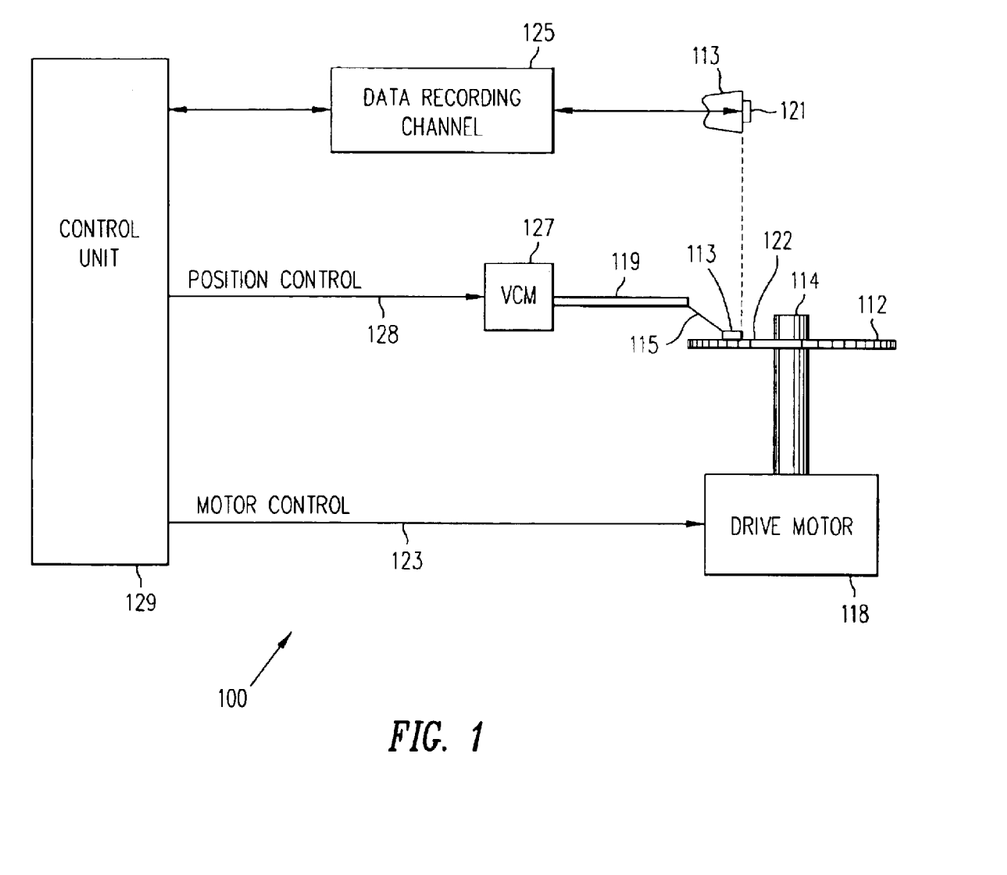
FIG. 1 is a simplified diagram of a magnetic recording disk drive system using the write head and disk media of the present invention.

Referring now to FIG. 1, there is shown a disk drive 100 embodying the present invention. As shown in FIG. 1, at least one rotatable magnetic disk 112 is supported on a spindle 114 and rotated by a disk drive motor 118. The magnetic recording media on each disk is in the form of an annular pattern of concentric data tracks (not shown) on the disk 112.

At least one slider 113 is positioned on the disk 112, each slider 113 supporting one or more magnetic read/write heads 121 of the present invention. As the disks rotate, the slider 113 is moved radially in and out over the disk surface 122 so that the heads 121 may access different portions of the disk where desired data is recorded. Each slider 113 is attached to an actuator arm 119 by means of a suspension 115. The suspension 115 provides a slight spring force which biases the slider 113 against the disk surface 122. Each actuator arm 119 is attached to an actuator 127. The actuator as shown in FIG. 1 may be a voice coil motor (VCM). The VCM comprises a coil movable within a fixed magnetic field, the direction and speed of the coil movements being controlled by the motor current signals supplied by a controller 129.

During operation of the disk storage system, the rotation of the disk 112 generates an air bearing between the slider 113 (the surface of the slider 113 which includes the head 121 and faces the surface of the disk 112 is referred to as an air bearing surface (ABS)) and the disk surface 122 which exerts an upward force or lift on the slider. The air bearing thus counter-balances the slight spring force of the suspension 115 and supports the slider 113 off and slightly above the disk surface by a small, substantially constant spacing during normal operation.

The various components of the disk storage system are controlled in operation by control signals generated by the control unit 129, such as access control signals and internal clock signals. Typically, the control unit 129 comprises logic control circuits, storage chips and a microprocessor. The control unit 129 generates control signals to control various system operations such as drive motor control signals on line 123 and head position and seek control signals on line 128. The control signals on line 128 provide the desired current profiles to optimally move and position the slider 113 to the desired data track on the disk 112. Read and write signals are communicated to and from the read/write heads 121 by means of the recording channel 125. Recording channel 125 may be a partial response maximum likelihood (PMRL) channel or a peak detect channel. The design and implementation of both channels are well known in the art and to persons skilled in the art. In the preferred embodiment, recording channel 125 is a PMRL channel.

The above description of a typical magnetic disk storage system, and the accompanying illustration of FIG. 1 are for representation purposes only. It should be apparent that disk storage systems may contain a large number of disks and actuator arms, and each actuator arm may support a number of sliders.

Figure 2A:
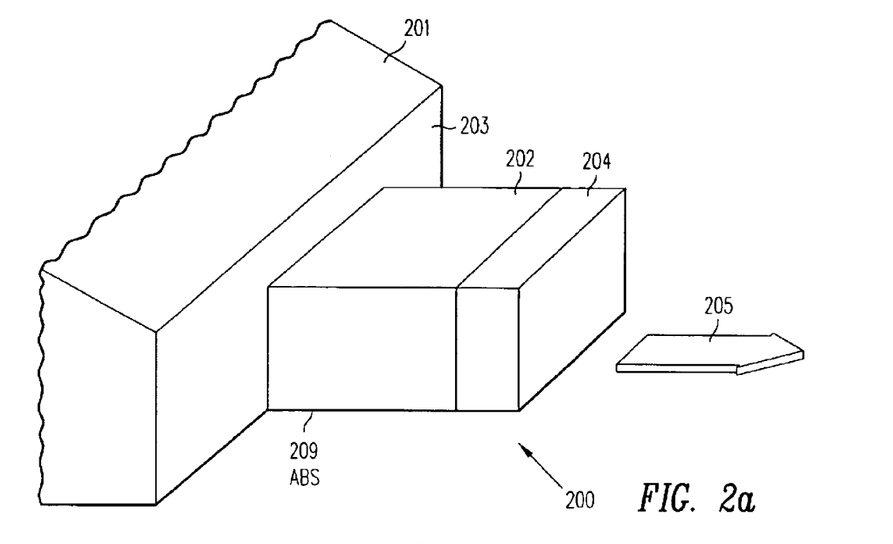
FIG. 2a is a perspective view, not to scale, of a read/write head of the present invention fixed on the trailing end of a slider.
Figure 2B:
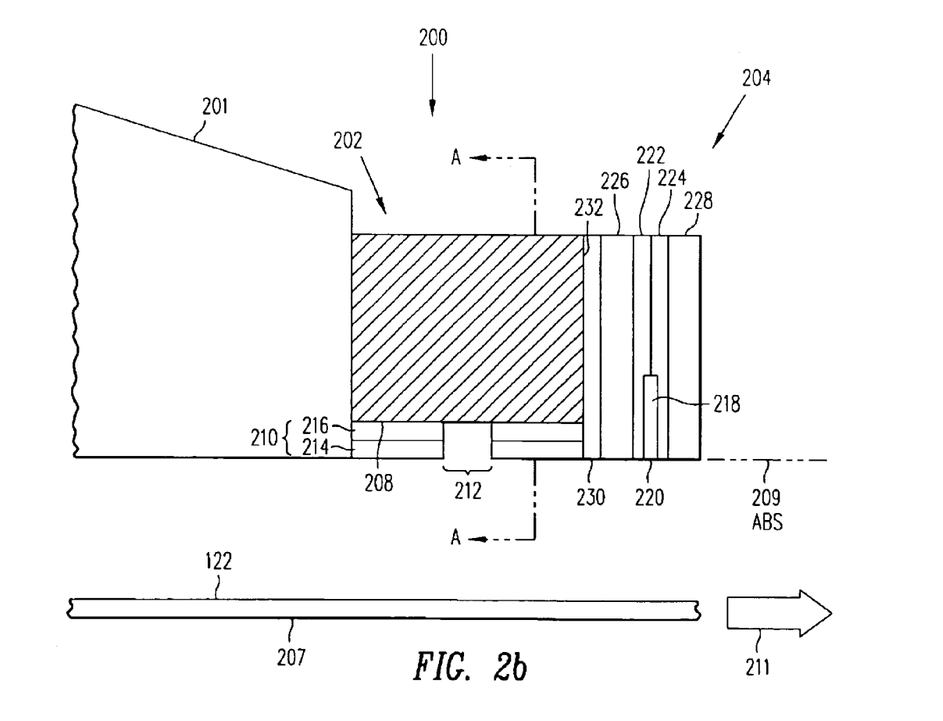
FIG. 2b is a vertical cross-section view, not to scale, of an embodiment of the read/write head of the present invention.

The present invention is now described with reference to FIGS. 2a, 2b, 2c and 2d. FIG. 2a is a perspective view, not to scale, of a read/write head 200 according to a preferred embodiment of the present invention. The read/write head 200 comprises a write head 202 fixed to a trailing end 203 of a slider 201 and a read head 204 fixed to the write head 202. The slider 201 supports the read/write head 200 so that an ABS 209 is separated from a data track 205 on a magnetic media moving relative to the read/write head as indicated schematically by the arrow head. FIG. 2b shows a schematic vertical cross-section view, not to scale, of the read/write head 200 suspended above a disk surface 122 comprising a magnetic recording media 207 moving relative to the read/write head 200 as indicated by the arrow head 211. The write head 202 comprises a very small aperture laser (VSAL) 206 having an emitting surface 208 at the ABS 209 coated with a fully reflecting multilayer thin film structure 210 with a very small aperture 212 through which the laser light is emitted. A suitable VSAL has been described by Partovi et al., Applied Physics Letters, Volume 75, No. 11, p. 1515. This publication describes a high power laser light source for near-field optics applications having light emitting apertures in the range of 50–400 nm square. The small size of the VSAL (typical size is 750 µm×300 µm×150 µm) allows it to be supported on a slider to form part of a read/write head. Since the spacing between the emitting surface of the VSAL and the magnetic recording media is small (in the range of 10–100 nm) compared to the wavelength of the emitted light (in the range of 600–1000 nm), the write head is operating well within the near-field optics regime. A multilayer thin film structure 210 comprises a fully reflective conductive layer 214 separated from the emitting surface 208 by an insulating layer 216. Alternatively, reflective conductive layer 214 may include a reflective layer on the insulating layer 216 and a separate conductive layer deposited over the reflective layer. The read head 204 comprises a thin film MR sensor 218 having a front edge 220 located at the ABS 209. The MR sensor 218 is sandwiched between first and second nonmagnetic gap layers 222 and 224 which are in turn sandwiched between first and second magnetic shield layers 226 and 228. The read head 204 is preferably formed by thin film vacuum deposition processes known to the art on an interface layer 230 deposited on a side surface 232 perpendicular to the ABS 209. The MR sensor 218 is preferably a giant magnetoresistive (GMR) or a magnetic tunnel junction (MTJ) sensor for reading magnetic signals well known to the art.

Figure 2C:
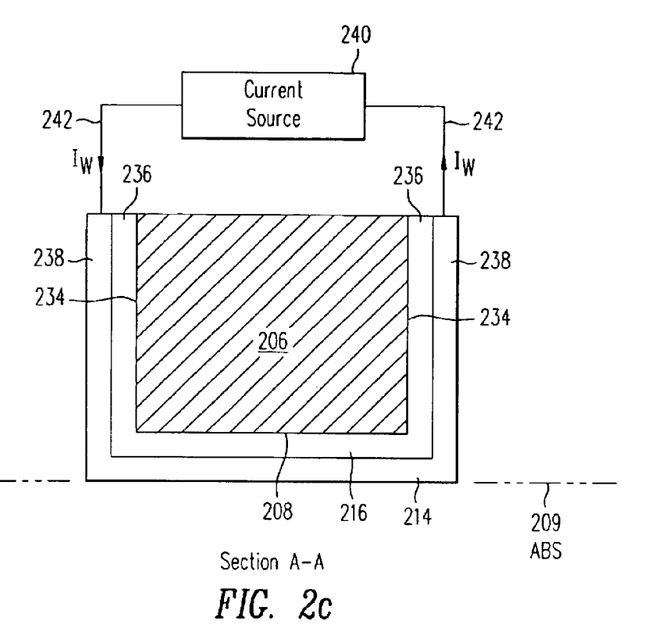
FIG. 2c is a sectional view, not to scale, of a section A—A of the read/write head of FIG. 2b.

FIG. 2c shows a sectional view, not to scale, of a section A—A of the read/write head 200 of FIG. 2b. The side surfaces 234 of the VSAL 206 are coated with insulating layers 236 separating conductive layers 238 from the VSAL 206 side surfaces. The conductive layers 238 contact conductive layer 214 to form a continuous conductive layer around the side surfaces 234 and the emitting surface 208 of the VSAL 206. A current source 240 is connected via leads 242 to the conductive layers 238 to provide a write current $I_W$ flowing through the conductive layer 214 during a write operation.

Figure 2D:
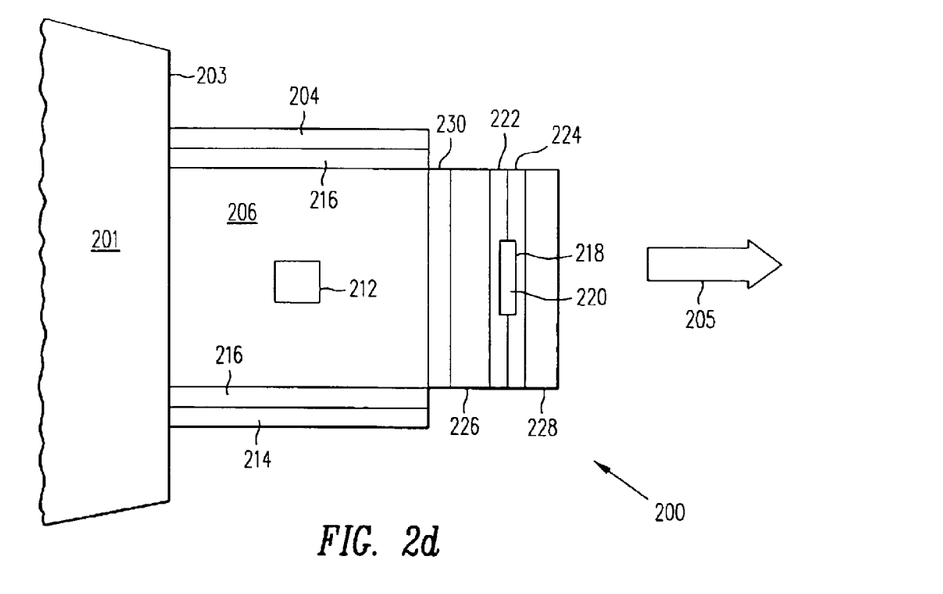
FIG. 2d is an air bearing surface view, not to scale, of the read/write head of FIG. 2b.

FIG. 2d shows an ABS view, not to scale, of the read/write head 200 indicating the positioning of the aperture 212 of the VSAL 206 and the front edge 220 of the MR sensor 218 relative to a data track 205 moving relative to the read/write head 200 as indicated by the arrow head.

Figure 2E:
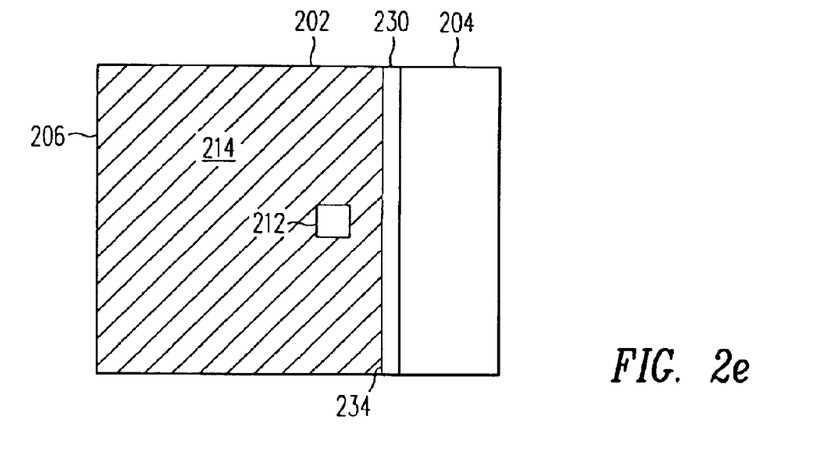
FIG. 2e is an air bearing surface view, not to scale, of a read/write head having an alternate location of the aperture of the VSAL.

It will be apparent that the aperture 212 need not be centered on emitting surface 208, but may, alternatively, be located nearer, as shown in FIG. 2e, or further from the side surface 234. Also, the conductive layer 214 may, alternatively, be shaped so as to direct and concentrate the write current $I_W$ relative to the VSAL aperture 212 so as to maximize the write current induced magnetic field extending to the data track 205 on the magnetic media in the write region. Two exemplary shapes for conductive layer 214 are shown in FIGS. 2f and 2g.

Figure 2F:
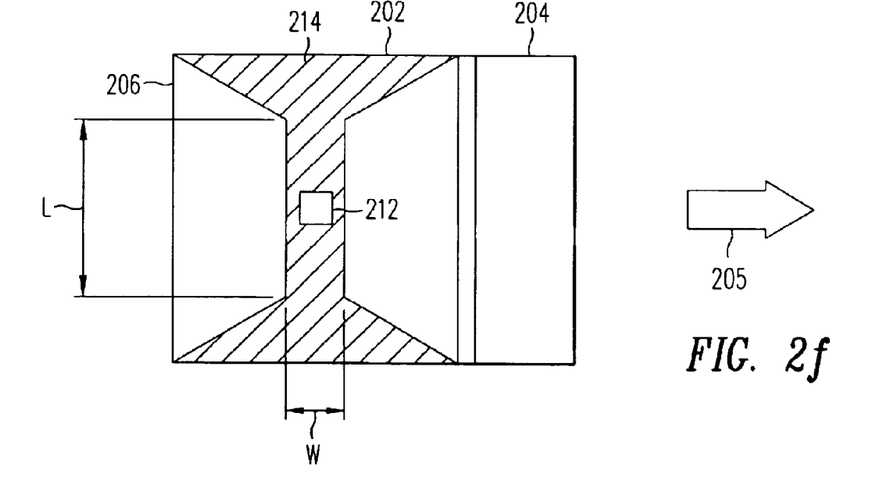
FIG. 2f is an air bearing surface view, not to scale, of a read/write head having an alternate shape of the conductive layer on the emitting surface of the VSAL.
Figure 2G:
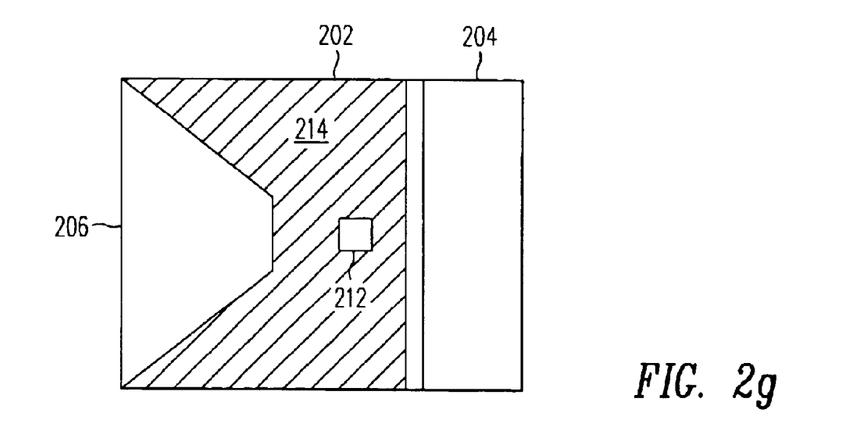
FIG. 2g is an air bearing surface view, not to scale, of a read/write head having a second alternate shape of the conductive layer on the emitting surface of the VSAL.

The current needed to provide a write field at the surface of a disk 112 separated from the ABS 209 by a distance of 10 nm has been estimated for the embodiment of the write head 202 shown in FIG. 2f. For a conductive layer 214 having a length L=10 µm perpendicular to the data track 205, a width W=1 µm parallel to the data track and a thickness T=100 nm, a write current $I_W$=15 mamp produces a write field $H_W$=3000 Oe. In order to meet the requirements for fast switching, the resistance of the conductive layer 214 should be kept low (less than about 10 ohms) so that a material having a resistivity of the order of 10 µohm-cm or less is needed. Therefore the conducting layer 214 may be formed of any high conductivity metal such as, for example, copper, silver, and aluminum, however, in order to also have high corrosion resistance conductive layer 214 is preferably formed of gold, platinum or palladium.

Figure 2H:
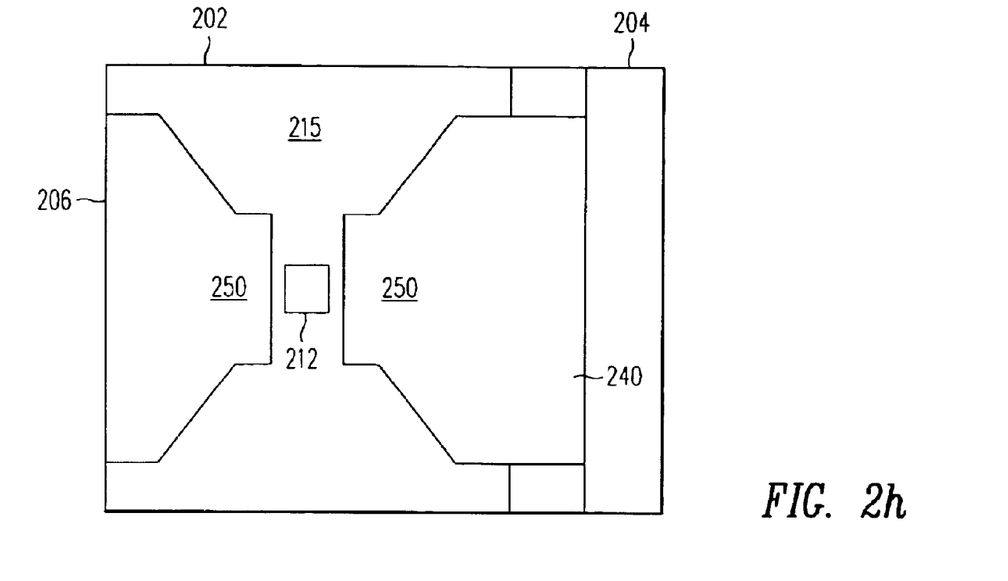
FIG. 2h is an air bearing surface view, not to scale, of an embodiment of a read/write head having a magnetic layer on the emitting surface of the VSAL.
Figure 2I:
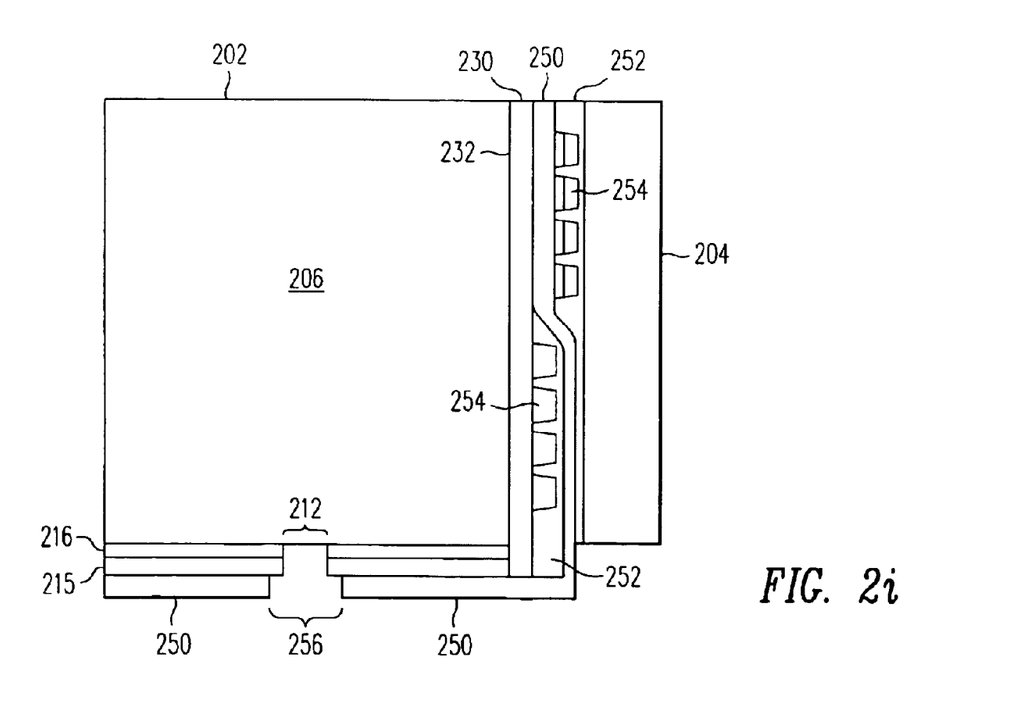
FIG. 2i is a vertical cross-section view, not to scale, of an embodiment of a read/write head having a magnetic layer on the emitting surface of the VSAL.

FIGS. 2h and 2i show another embodiment of the invention having a write head 202 differing from the write heads shown in FIGS. 2a–2g in having an inductive magnetic element 240 to provide a write field instead of the conductive layer 214. The inductive magnetic element 240 comprises a ferromagnetic pole structure 250 and a pancake coil structure 254 through which write current flows to induce a magnetic write field in the ferromagnetic pole structure 250 as is well known in the art. In this embodiment, a reflective layer 215 having an aperture 212 is deposited over the emitting surface. A soft ferromagnetic pole structure 250 is deposited over the reflective layer 215 for providing a magnetic write field across the write gap 256 at the aperture 212. The soft ferromagnetic pole structure 250 abuts a ferromagnetic pole 251 formed on the side surface 232 of the VSAL 206. The coil structure 254 isolated by insulation layers 252 is deposited over and under the ferromagnetic pole 251 as is well known to the art of inductive write head design. Leads (not shown) are connected to the ends of coil structure 254 for providing a write current. The read head 204 may be deposited over the ferromagnetic pole 251 and coil structure 254. The ferromagnetic pole 251 and ferromagnetic pole structure 250 are preferably formed Ni—Fe, Fe—Co or other high moment, high Curie temperature ferromagnetic materials.

A write operation using the read/write head 200 of the present invention to write on a magnetic material with a very high magneto-crystalline anisotropy $K_U$ suitable for very high density magnetic data will now be described. The magnetic field pulse required for writing a transition into the magnetic recording media is produced by a short current pulse $I_w$ directed via conductive layers 238 through the metallic reflective layer 214 perpendicular to the direction of motion of the magnetic media relative to the read/write head 200 to produce a magnetic field pulse with the field extending into the region between the the aperture 212 and the magnetic media. However, because of the high magneto-crystalline anisotropy $K_U$ of the magnetic recording media, the media switching field $H_o$ will be too high for switching by the magnetic field pulse at ambient temperature. The media switching field $H_o$ is proportional to the ratio $K_U/M_S$, where $M_S$ is the saturation magnetization.

To reduce the media switching field $H_o$ to a sufficiently low value for the current generated magnetic field pulse to switch the magnetization of the recording media, a thermal pulse is simultaneously or nearly simultaneously applied to the recording media by means of a pulse of light from the VSAL 206, or alternatively, by cw light from the VSAL passing over the recording media at a high linear velocity. The light from the VSAL 206 impinges on and is absorbed by the magnetic media resulting in rapid heating of the magnetic media in the write gap region. The localized heating of the magnetic media results in a decrease of the magneto-crystalline anisotropy $K_U$ and the magnetization saturation $M_S$. Generally, $K_U$ and $M_S$ are functions of temperature and decrease with temperature according to $K_U(T) \alpha \{M_S(T)\}^n$ such that $H_o=K_U/M_S$ also decreases with increasing temperature (for example, n=3 for cubic materials and n=10 for hexagonal materials).

Figure 3A:
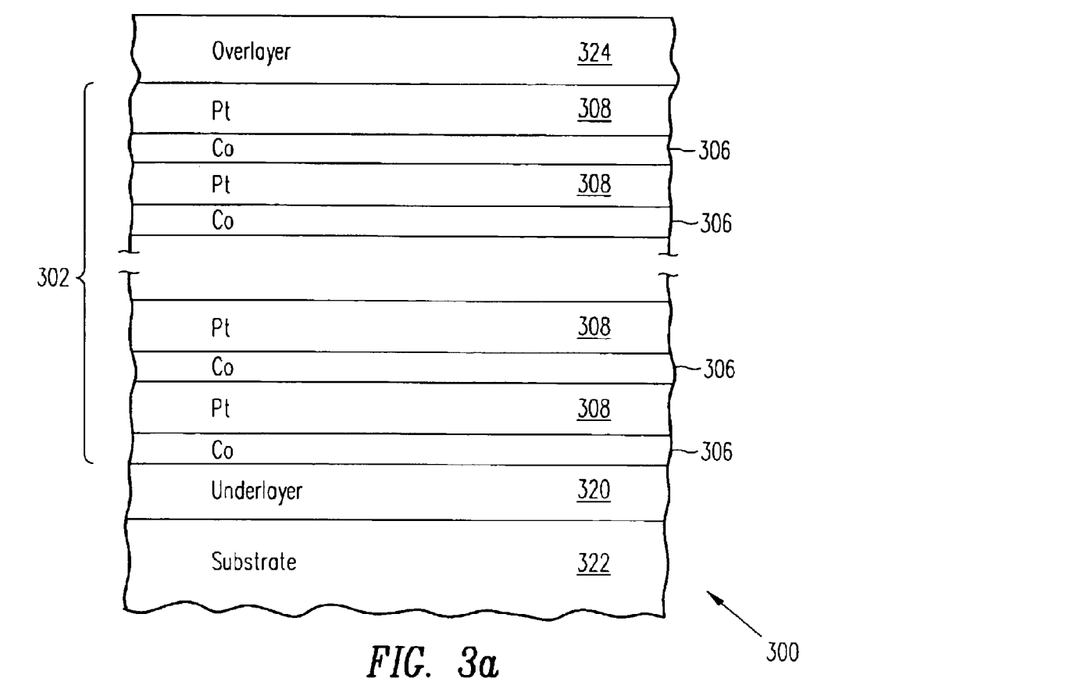
FIG. 3a is a cross-sectional view, not to scale, of a high magneto-crystalline anisotropy magnetic media for use with the read/write head of the present invention.

FIG. 3a shows the structure of a Co/Pt multilayer magnetic media material 300, an illustrative example of a high $K_U$ magnetic material suitable for use with the read/write head of the present invention. The Co/Pt multilayer of this embodiment comprises a stack 302 of alternating layers of Co 306 having a thickness of about 2 Å and layers of Pt 308 having a thickness of about 10 Å. Typically, the stack 302 includes in the range of 4–15 repetitions of the Co and Pt layers 306 and 308. The stack 302 is deposited over an underlayer 320 deposited on a substrate 322 to help promote the desired texture and crystalline structure of the layers in the stack 302. An overlayer 324 is deposited over the stack 302 for protection from oxidation and mechanical damage.

Figure 3B:
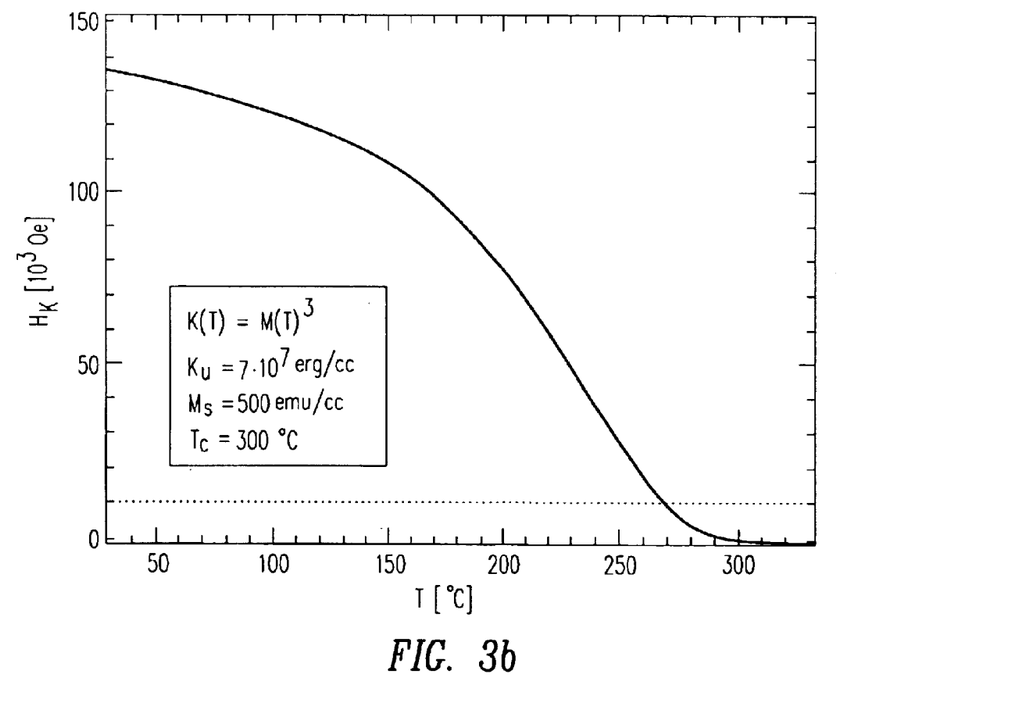
FIG. 3b is a graph of the temperature dependence of the magneto-crystalline anisotropy field $H_K$ for a high $K_U$ magnetic media material.

FIG. 3b shows the temperature dependence of $H_K$ for an exemplary CoPt multilayer of the kind shown in FIG. 3a. Since, in order to write a transition, the switching field $H_O$ cannot exceed the write field capability of the recording head which is about 5000–10000 Oe, the switching region in the magnetic media of this example must be heated by the light pulse from the VSAL 206 to a temperature of about 275° C. Because the slope $dH_K/dT$ is very steep in the vicinity of the switching field and the Curie temperature $T_C$ of the media cannot be exceeded for magnetic writing to be possible, well-controlled heating of the media by the light pulse is critical for successful writing to be achieved.

In order to overcome the need for critical temperature control during the current pulse write operation, a novel magnetic recording media has been invented for use with the read/write head of the present invention. In this embodiment, the magnetic media, referred to as a 'thermal spring' magnetic recording media, comprises two stacks of alternating layers of magnetic and nonmagnetic material. The basic idea of the thermal spring magnetic recording media will now be briefly described. Thermal spring media are ferromagnetic recording media comprising two stacks (layer stacks). The first stack, with a relatively low Curie temperature $T_{C1}$, has a room temperature coercivity too high for writing with the field from a conventional magnetic recording write head. The second stack, with a high Curie temperature $T_{C2}$, has a lower coercivity suitable for writing with a conventional magnetic recording write head. During the write process, the media is locally heated by a thermal element of the write head to a temperature approximately equal to or slightly greater than $T_{C1}$, thereby reducing its coercivity. The desired data bit pattern is then recorded in the second stack by the field from a magnetic element of the write head. Immediately after writing, the media cools as it moves out of the heating zone of the thermal element and as the first stack cools below its Curie temperature $T_{C1}$ it becomes ferromagnetic again and the bit pattern is "copied" or transferred from the second stack to the first stack by means of a magnetic exchange interaction (exchange spring mechanism). On further cooling, the anisotropy/coercivity of the first layer returns to its original high value thereby providing the desired long-term stability of the magnetically recorded data.

Figure 4A:
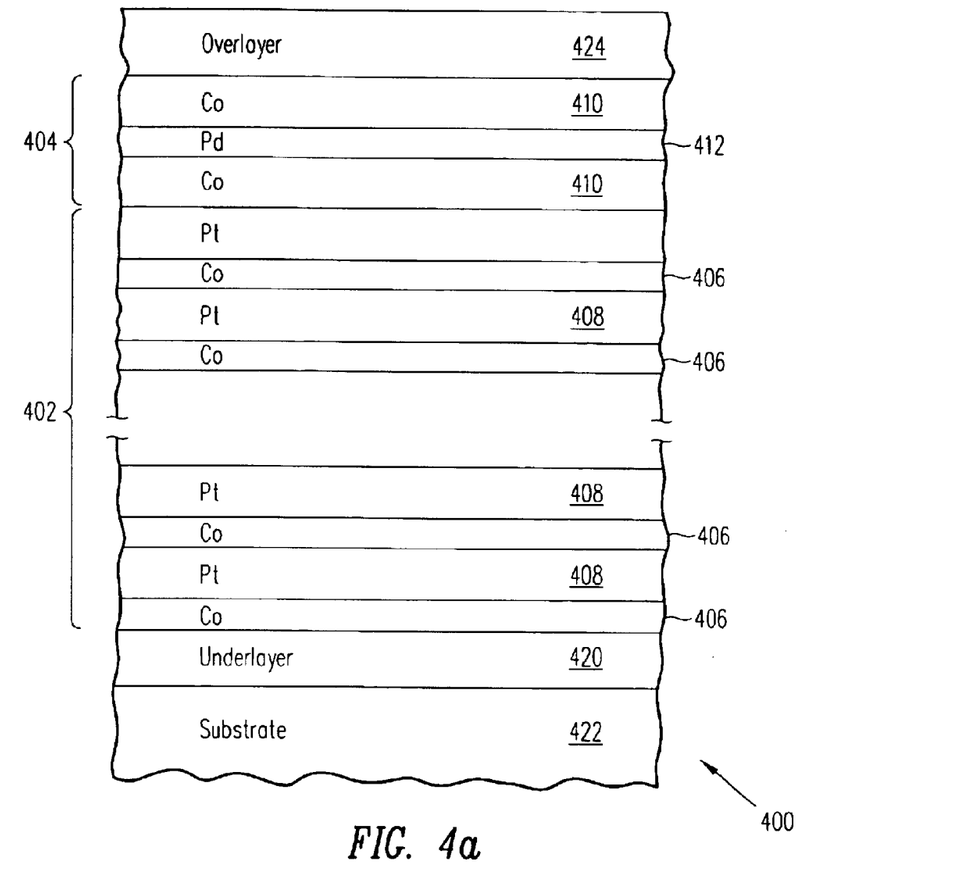
FIG. 4a is a cross-sectional view, not to scale, of a preferred embodiment of a thermal spring magnetic media of the present invention.

FIG. 4a shows the layer structure of a thermal spring magnetic recording media 400 for use with the read/write head of the present invention. The thermal spring media 400 includes a first stack 402 comprising first magnetic layers 406 of cobalt (Co) having a thickness in the range of 1–8 Å interleaved with first nonmagnetic layers 408 of platinum (Pt), or alternatively of palladium (Pd), having a thickness in the range of 1–25 Å and a second stack 404, in laminar contact with the first stack, comprising second magnetic layers 410 of Co having a thickness in the range of 10–50 Å interleaved with second nonmagnetic layers 412 of palladium (Pd), or alternatively of platinum (Pt), having a thickness in the range of 1–25 Å. The first stack 402 is made of a plurality of repetitions of the layers of Co and Pt materials, preferably 4–15 repetitions. The second stack 404 is made of a plurality of repetitions of the layers of Co and Pd materials, preferably 1–4 repetitions. Alternatively, the first second magnetic layers 406 and 410 may be made of ferromagnetic cobalt-based alloys such as Co—Pt—Cr—B, Co—Pt—Cr, Co—Cr, Co—Pd—Cr—B, Co—Pt—Cr—Nb, Co—Pd—Cr—Nb and Co—Pd—Cr.

A magnetic recording disk using the thermal spring media 400 is made by depositing an underlayer or underlayers 420 on a substrate 422 followed by deposition of alternating layers of Co and Pt to form the first stack 402 on the underlayer 420. The second stack 404 is then deposited over the first stack 402 by alternately depositing layers of Co and Pt to the desired number of repetitions. A protective overlayer 424 is deposited over the second stack 404 to provide corrosion resistance and mechanical protection. The thermal spring media 400 may be fabricated using thin film deposition processes well known to the art.

Figure 4B:
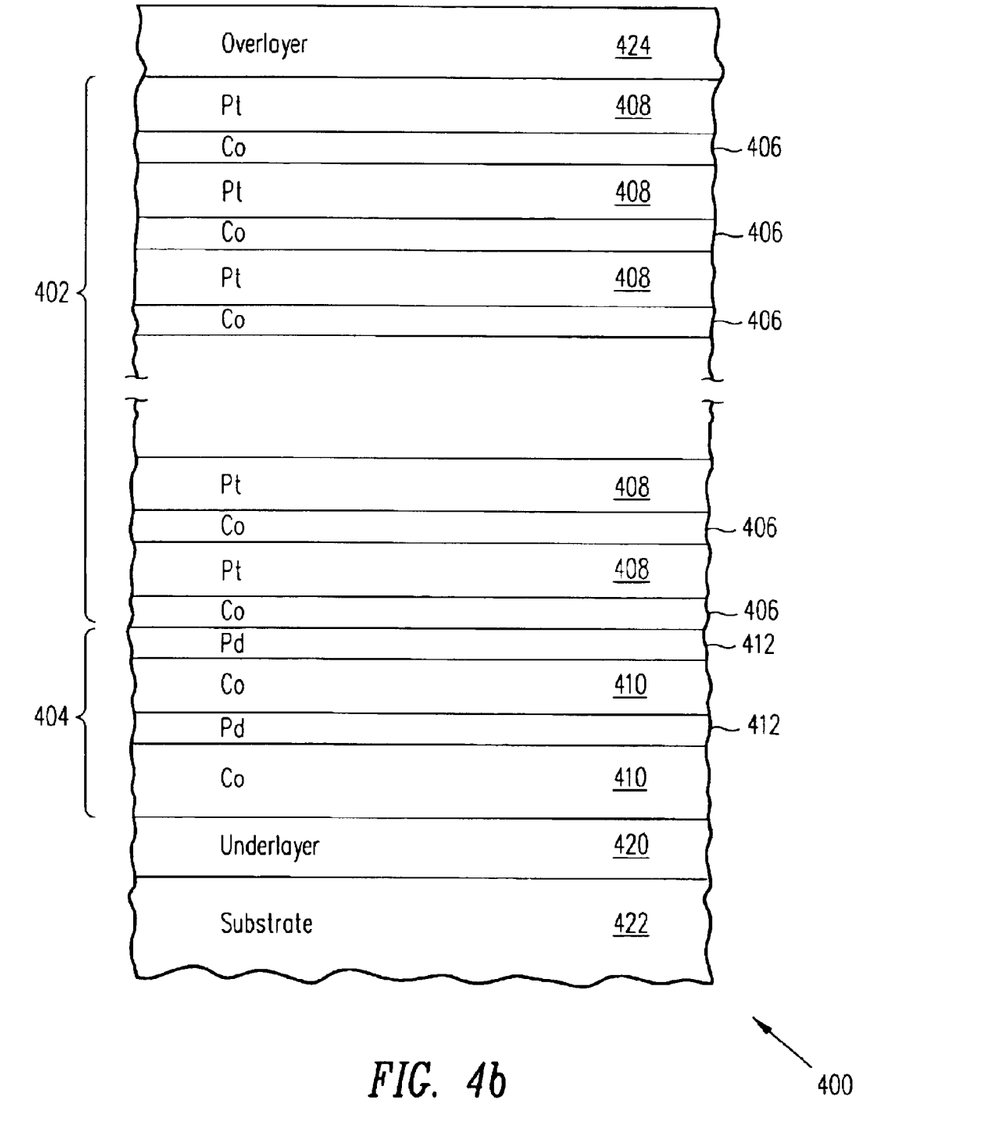
FIG. 4b is a cross-sectional view, not to scale, of an alternate embodiment of a thermal spring magnetic media of the present invention.

In FIG. 4a, the thermal spring media 400 is shown with the second stack 404 having the lower magneto-crystalline anisotropy and the higher Curie temperature deposited over the first stack 402 having the higher magneto-crystalline anisotropy and the lower Curie temperature. Alternatively, as shown in FIG. 4b, the order of the first and second stacks 402 and 404 may be inverted so that the first stack 402 is deposited over the second stack 404. In this alternative embodiment, the layer structure of a magnetic recording disk using the media 400 is substrate/underlayer/second stack/first stack/overlayer.

The first and second stacks 402 and 404 of the thermal spring media 400 provide two exchange coupled ferromagnetic layers having different Curie temperatures. The first stack 402 has a high magneto-crystalline anisotropy $K_{U1}$, a relatively low saturation magnetization $M_{S1}$ and a low Curie temperature $T_{C1}$. The second stack 404 has a relatively low magneto-crystalline anisotropy $K_{U2}$, a high saturation magnetization $M_{S2}$ and a high Curie temperature $T_{C2}$. Assuming $K(T)/K_0 = (M(T)/M_0)^3$, to first order $H_K$ of the bylayer is $H_K = (3K_{U1} + K_{U2})/(3M_{S1} + M_{S2})$.

Figure 5A:
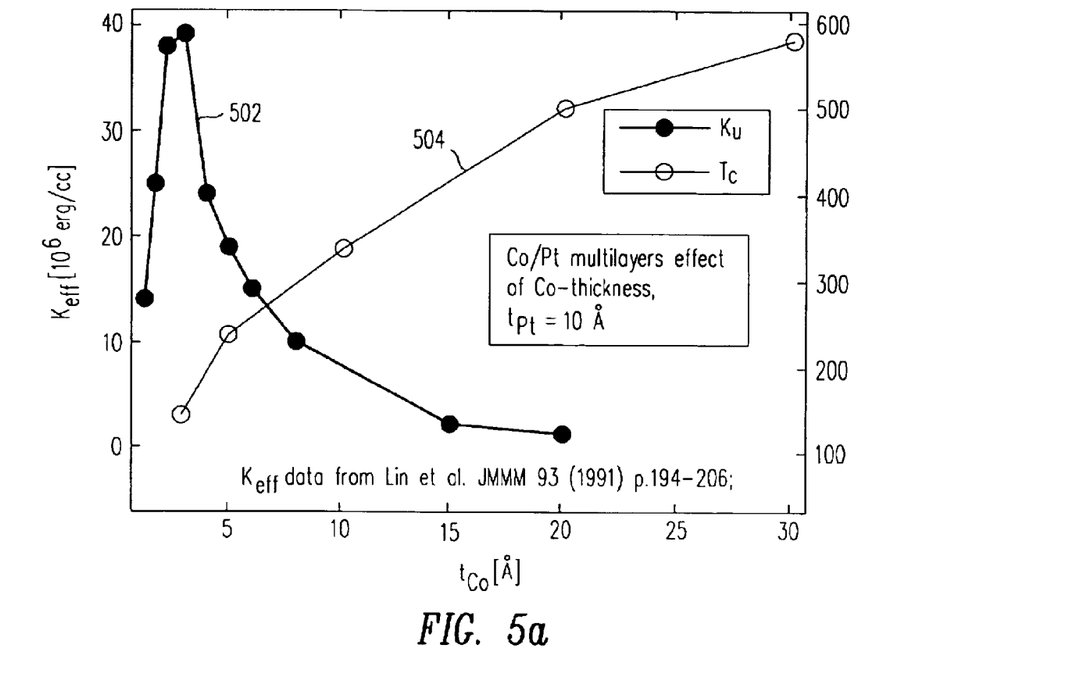
FIG. 5a is a graph of the magneto crystalline anisotropy and the Curie temperature of Co/Pt multilayers as functions of the Co layer thickness for a fixed Pt layer thickness of 10 Å.

FIG. 5a shows experimental data for the dependence on thickness of the Co layers of the effective magneto crystalline anisotropy $K_U$ (curve 502) and the Curie temperature $T_C$ (curve 504) of Co/Pt multilayers for a fixed Pt layer thickness in the stack of 10 Å. The data for effective $K_U$ is from Lin et al., JMMM 93,(1991) p. 194–206. By choosing the thickness of the Co layers in the Co/Pt multilayer stack, stacks having desired values of $K_U$ and $T_C$ may be obtained.

Figure 5B:
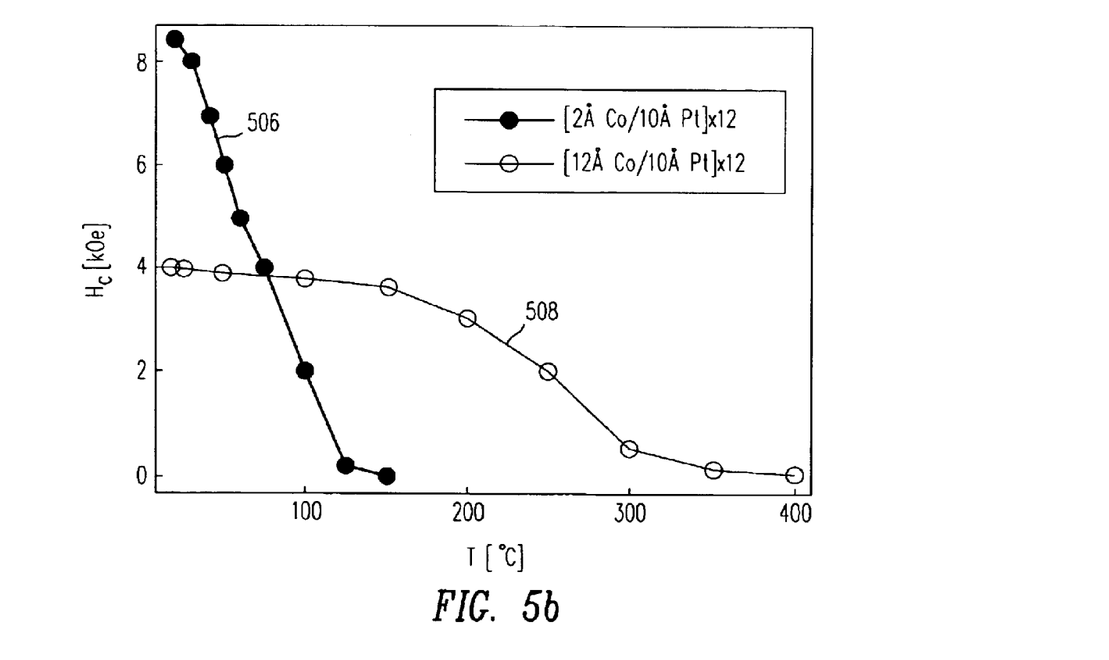
FIG. 5b is a graph of the temperature dependence of the coercivity of multilayer (12 repetitions) stacks of Co/Pt having different Co layer thicknesses.

FIG. 5b shows experimental data for the temperature dependence of the coercivity $H_C$ for multilayer (12 repetitions) stacks of Co/Pt having 2 Å thick Co layers and 10 Å thick Pt layers in a first stack (curve 506) and 12 Å thick Co layers and 10 Å thick Pt layers in a second stack (curve 508). By choosing a Co layer thickness of 2 Å, the data shows that a Co/Pt stack having a high coercivity and low Curie temperature (curve 506) is obtained while choosing a Co layer thickness of 12 Å yields a Co/Pt stack having a relatively low coercivity and higher Curie temperature (curve 508).

Figure 5C:
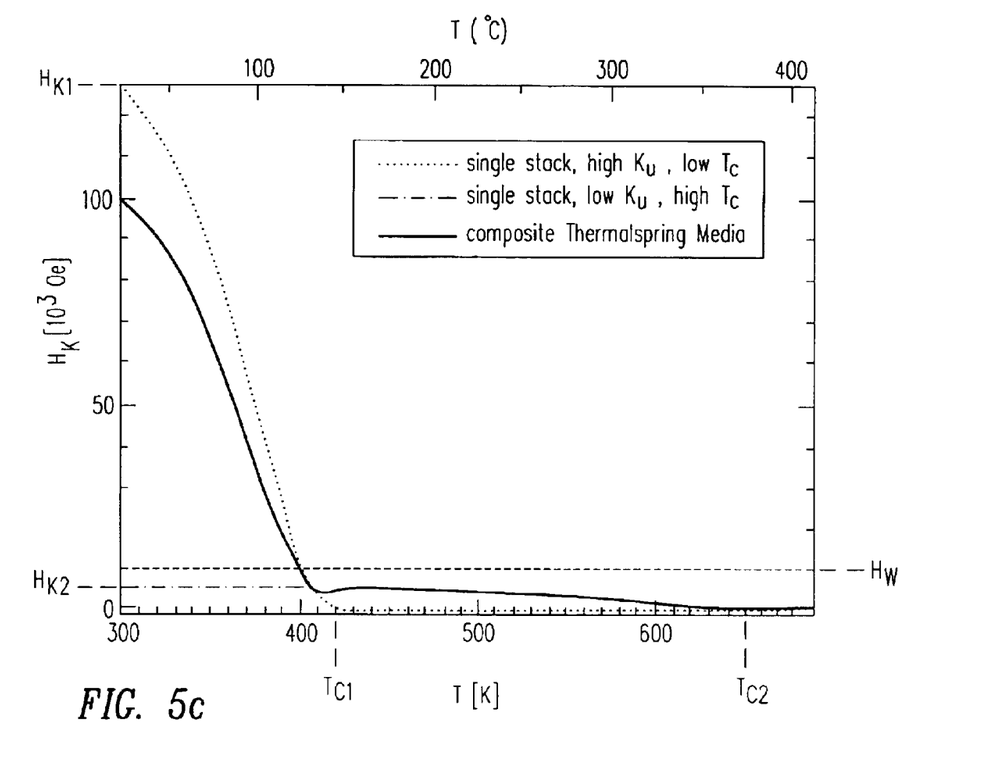
FIG. 5c is a graph of the temperature dependence of the magneto-crystalline anisotropy field $H_K$ for an embodiment of a thermal spring magnetic media of the present invention.

FIG. 5c shows an exemplary temperature dependence of the anisotropy field $H_K$ for the thermal spring media 400. The Curie temperature $T_{C1}$ of the high anisotropy stack 402 is chosen to to be 100–350° C. lower than the Curie temperature $T_{C2}$ of the low anisotropy stack 404. The temperature region between $T_{C2}$ and $T_{C1}$ provides a broad temperature range with nearly uniform anisotropy field to which the thermal pulse generated by the light from the VSAL 206 may heat the media during the write process without driving the media into a nonmagnetic state.

Figure 6A:
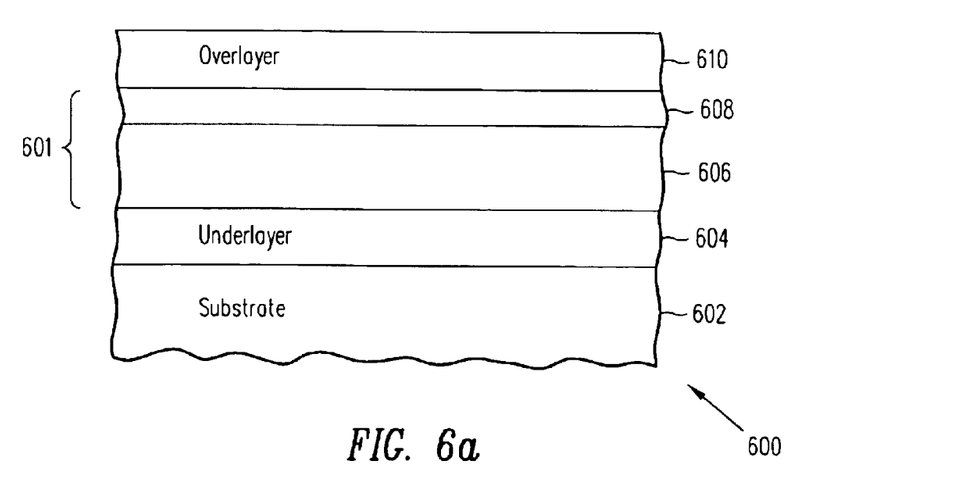
FIG. 6a is a cross-sectional view, not to scale, of a second embodiment of a thermal spring magnetic media of the present invention.

FIG. 6a shows the layer structure of a second embodiment of a thermal spring magnetic recording media 600 for use with the read/write head of the present invention. The thermal spring media 600 comprises a bilayer 601 formed of a thick first magnetic layer 606 of high magneto-crystalline anisotropy $K_{U1}$, low Curie temperature $T_{C1}$ material and an adjacent thin second magnetic layer 608 of low $K_{U2}$, high saturation magnetization $M_{S2}$, high Curie temperature $T_{C2}$ material in laminar contact with the first layer. The first magnetic layer 606 is made of the $L1_0$ phase of Fe—Pt—Ni where a small amount of Ni is added to reduce $T_C$ to the desired level. Table 1 is data showing the effect of Ni concentration on the magneto-crystalline anisotropy $K_U$ and the Curie temperature $T_C$ of $L1_0$ materials. The first magnetic layer 606 of Fe—Pt—Ni has a thickness of approximately 60 Å. Alternatively, the first magnetic layer 606 may be formed of other granular, high anisotropy alloys such as the $L1_O$ phases of Fe—Pt, Co—Pt and Co—Pd. The second magnetic layer 608 is made of Co—Pt—Cr having a thickness of approximately 20 Å deposited over the first magnetic layer 606. Alternatively, the second magnetic layer 608 may be formed of other low $K_U$, high $M_S$, high $T_C$ materials including Co—Pt, Co—Pt—Cr, Co—Pt—Cr—Nb, Co—Pt—Cr—B, Co—Pd, Co—Pd—Cr, Co—Pd—Cr—Nb and Co—Pd—Cr—B alloys.

TABLE 1

Magneto-crystalline anisotropy and Curie temperature of $L1_0$ materials

| Composition | $K_U$ (erg/cc) | $T_C$ (° C.) |
|---|---|---|
| $Fe_{55}Pt_{45}$ | $7 \times 10^7$ | 500 |
| $Fe_{45}Pt_{45}Ni_{10}$ | $3 \times 10^7$ | 400 |
| $Fe_{35}Pt_{45}Ni_{20}$ | $2 \times 10^6$ | 300 |

The magnetic media 600 is formed on a substrate 602 on which an underlayer 604 is deposited. The underlayer 604 is a seed layer which may be chosen to promote granular structure of the bilayer 601 having either in-plane or out-of-plane easy axis alignment for longitudinal or perpendicular recording applications, respectively. The first and second magnetic layers 606 and 608 are deposited sequentially over the underlayer 604 and a protective overlayer 610 is deposited over the second magnetic layer 608. Alternatively, as discussed above with reference to FIGS. 4a and 4b, the order of the first and second magnetic layers 606 and 608 shown in FIG. 6a may be inverted with second magnetic layer 608 deposited over first magnetic layer 606.

The first and second layers 606 and 608 of the thermal spring media 600 provide two exchange coupled ferromagnetic layers having different Curie temperatures. As discussed above with reference to the thermal spring magnetic media 400, the first magnetic layer 606 has a high magneto-crystalline anisotropy $K_{U1}$, a relatively low saturation magnetization $M_{S1}$ and a low Curie temperature $T_{C1}$. The second magnetic layer 608 has a relatively low magneto-crystalline anisotropy $K_{U2}$, a high saturation magnetization $M_{S2}$ and a high Curie temperature $T_{c2}$. Assuming $K(T)/K_0=(M(T)/M_0)^3$, to first order $H_K$ of the bilayer is $H_K=(3K_{U1}+K_{U2})/(3M_{S1}+M_{S2})$. FIG. 5c shows an exemplary temperature dependence of the anisotropy field $H_K$ for the thermal spring media 600. The Curie temperature $T_{C1}$ of the high anisotropy layer 606 is chosen to be 100–350° C. lower than the Curie temperature $T_{C2}$ of the low anisotropy layer 608. The temperature region between $T_{C2}$ and $T_{C1}$ provides a broad temperature range with nearly uniform anisotropy field to which the thermal pulse generated by the light from the VSAL 206 may heat the media during the write process without driving the media into a nonmagnetic state.

Figure 6B:
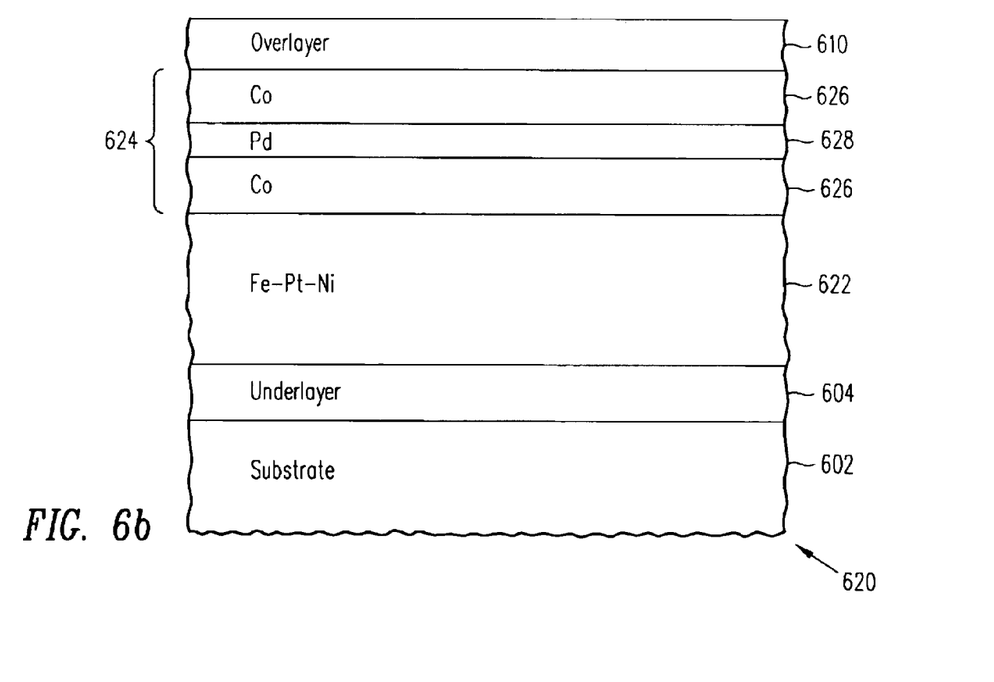
FIG. 6b is a cross-sectional view, not to scale, of a third embodiment of a thermal spring magnetic media of the present invention.

FIG. 6b shows the layer structure of a third embodiment of a thermal spring magnetic recording media 620 for use with the read/write head of the present invention. The thermal spring media 620 comprises a thick first magnetic layer 622 of a granular $L1_0$ phase of Fe—Pt—Ni having a thickness of approximately 60 Å and an adjacent thin stack 624, in laminar contact with the first magnetic layer, made of a plurality of repetitions, preferably 1–4 repetitions, of second magnetic layers 626 of Co having a thickness in the range of 10–50 Å interleaved with nonmagnetic layers 628 of Pd, or alternatively Pt, having a thickness in the range of 1–25 Å. Alternatively, the first magnetic layer 622 may be formed of other granular, high anisotropy alloys such as the $L1_0$ phases of Fe—Pt, Co—Pt and Co—Pd. The second magnetic layers 626 may be made of ferromagnetic cobalt-based alloys such as Co—Pt—Cr—B, Co—Pt—Cr, Co—Cr, Cr—Pt—Cr—Nb, Co—Pd—Cr—Nb, Co—Pd—Cr—B and Co—Pd—Cr. The first magnetic layer 622 and the stack 624 provide two exchange coupled ferromagnetic layers having different Curie temperatures. The first magnetic layer 622 has high magneto-crystalline anisotropy $K_{U1}$, relatively low saturation magnetization $M_{S1}$ and a low Curie temperature $T_{C1}$. The stack 624 of alternating magnetic and nonmagnetic layers has low magneto-crystalline anisotropy $K_{U2}$, high saturation magnetization $M_{S2}$ and a high Curie temperature $T_{C2}$. The Curie temperature $T_{C1}$ of the first magnetic layer 622 is chosen to be 100–350° C. lower than the Curie temperature $T_{C2}$ of the stack 624. Alternatively, the order of the first magnetic layer 622 and the stack 624 in FIG. 6b may be inverted with the stack 624 deposited on the underlayer 604 and the first magnetic layer 622 deposited over the stack 624.

Figure 7:
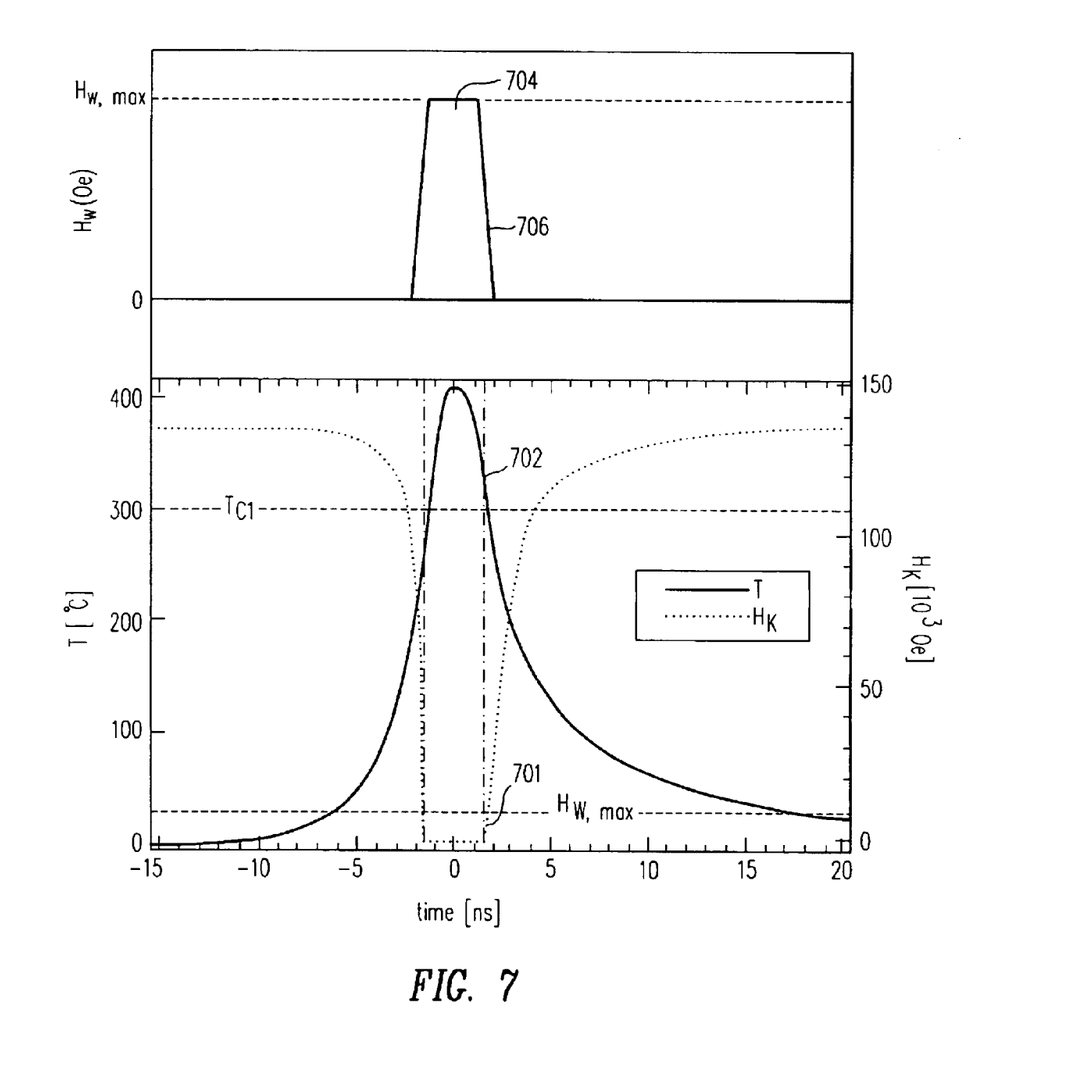
FIG. 7 is a graph of the time dependence of the write field $H_W$ and of the temperature and magneto-crystalline anisotropy field $H_K$ of a thermal switch magnetic media material heated by a nanosecond timescale VSAL pulse.

FIG. 7 shows the time dependence of the temperature of an exemplary thermal spring media due to heating by the light from the VSAL 206 and the concomitant variation of the anisotropy field $H_K$ of the media caused by the thermal pulse. At the trailing end 702 of the thermal pulse, the media cools rapidly to a write temperature $T_W$ just below $T_{C1}$ where the gradient $dH_K/dT$ is a maximum. By adjustment of the heater power provided by the VSAL 206, the time when the temperature $T_W$ is reached may be chosen to coincide with the onset of the highest magnetic field gradient $dH/dx|_{magnetic}$ from the current generated magnetic field pulse. By temporally overlapping the magnetic field gradient $dH/dx|_{magnetic}$ with the thermal field gradient $dH_K/dx|_{thermal}=dH_K/dT.dT/dx$, the transition width of the written data can be shortened as will be described hereafter.

A process for writing data on a thermal spring magnetic recording media using the read/write head of the present invention will now be described with reference to FIG. 7. A portion of the magnetic recording media passing under the aperture on the thermal element emitting surface is rapidly heated to a temperature between the first and second Curie temperatures $T_{C1}$ and $T_{C2}$ (in the range of 310–400° C. for an exemplary thermal spring media having $T_{C1}=300°$ C.) due to absorption of light emitted by the VSAL. The heating step may be implemented by using a short pulse of light from the VSAL or, alternatively, by using continuous wave (cw) emission from the VSAL and relying on the rapid motion of the media relative to the write head to provide a thermal gradient in the media at the trailing edge of the aperture. As the heated portion of the media moves past the aperture it cools rapidly below $T_{C1}$ resulting in a large thermal gradient at the trailing end 702 of the thermal pulse and a rapid increase in the anisotropy field $H_K$. A magnetic write field pulse 704 is turned on by providing a write current pulse to the write element of the write head. Preferably, the steep magnetic field gradient 706 at the trailing edge of the magnetic write field pulse 704 overlaps and is coincident with the maximum gradient 701 of the anisotropy field $H_K$. The magnetic write field pulse 704 switches the magnetization of the magnetic recording media just prior to the increase of the anisotropy field $H_W$ above the maximum magnetic write field $H_{W,max}$ due to the rapid cooling of the media. overlapping of the magnetic field gradient and the thermal gradient results in the shortest write transition widths in the media. Further cooling of the magnetic recording media results in a further increase of the anisotropy field $H_K$ and the magnetocrystalline anisotropy $K_U$ providing very high thermal stability for the recorded magnetic data.

The write field gradient produced by the short write current pulse will be steepest in the vicinity of the trailing edge of the light aperture. While the data bit width will be defined mainly by the size and shape of the aperture, i.e. by the temperature profile and gradient created by the light spot, the data bit length will be defined by the overlapping thermal and magnetic field gradients. To first order, the magnetic field gradient $dH_K/dx|_{magnetic}$ due to the rising magnetic field produced by the write current pulse adds to the thermal field gradient $dH_K/dx|_{thermal}=dH_K/dT.dT/dx$ due to the rapid media cooling at the trailing edge of the VSAL pulse. This additive effect of the magnetic and thermal gradients of the anisotropy field $H_K$ allows very short transition widths to be achieved.

Figure 8:
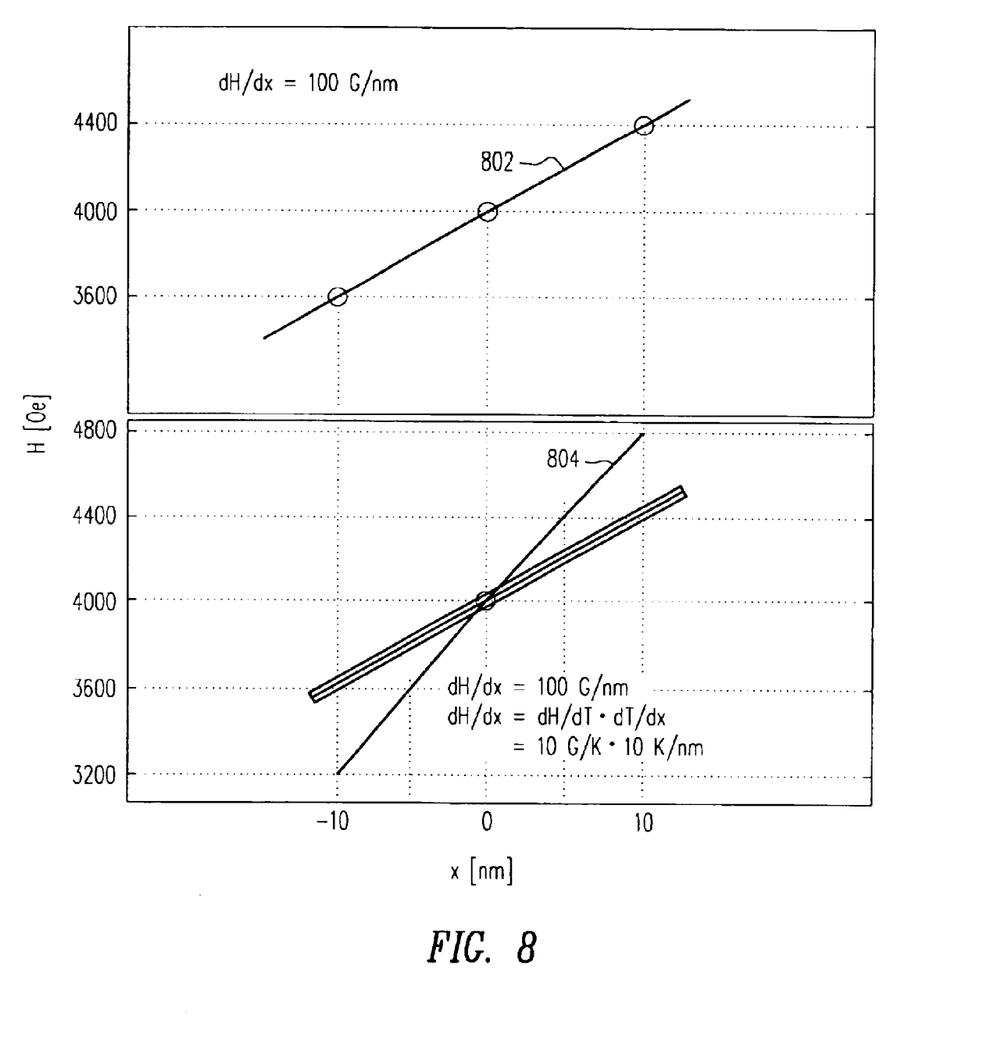
FIG. 8 is a graph of the thermal and magnetic field gradients modeled for a 100 nm square aperture separated 5 nm from the magnetic media surface.

An example illustrating the improved transition widths expected from the combined magnetic field and thermal field gradients is now described with reference to FIGS. 5c and 8. FIG. 5c shows the temperature dependence of $H_K$ for an exemplary high anisotropy magnetic media consisting of grains with a rectangular switching field distribution of +/−10% around an applied field $H=H_K/2=4000$ G. Assuming a write head which delivers a rise of the magnetic write field from 0 to 8000 G in a distance of 200 nm, a magnetic gradient $dH_K/dx|_{magnetic}=40$ G/nm is obtained. With the above grain distribution, the write transition width $a_W$ for magnetic only writing is $a_W=H_K/(dH_K/dx)|_{HW+/-10\%}=20$ nm as shown by curve 802 in the upper portion of FIG. 8.

For the case of combined magnetic field and thermal field writing, the slope of $H_K$ around the writing temperature is estimated from FIG. 5c to be $dH_K/dT=600$ G/° C. For illustrative purposes, the thermal gradient is assumed to be $dT/dx=0.07°$ C./nm so that $dH_K/dx|_{thermal}=dH_K/dT.dT/dx=(600$ G/° C.$)$ $(0.07°$ C./nm$)=40$ G/nm is approximately equal to the magnetic gradient $dH_K/dx|_{magnetic}$. Referring to the lower portion of FIG. 8, switching again starts at 3600 Oe, but since the media is cooling rapidly and thus raising $H_K$ at the leading edge, the thermal and magnetic gradients add and the 3600 Oe spot is now only 5 nm away from the 4000 Oe spot as shown by curve 804 compared to the 10 nm distance for magnetic field only writing shown by curve 802 resulting in a transition width $a_w=10$ nm for combined magnetic and thermal writing.

We have estimated the magnitude of thermal gradients and thus transition widths that can be achieved. Typical magneto-optical media known to the art have thermal gradients of about $dT/dx=0.25°$ C./nm which, for a slope of $H_K$ around the writing temperature of 600° C./nm, results in $dH_K/dx|_{thermal}=dH_K/dT.dT/dx=(600$ G/° C.$)$ $(0.25°$ C./nm$)=$ 150 G/nm and a transition width $a_W=4.2$ nm. For thermally optimized media with a localized laser spot much steeper thermal gradients are possible. From simple heat dissipation considerations we estimate $dT/dx=5°$ C./nm is achievable resulting in $dH_K/dx|_{thermal}=3000$ G/nm and $a_W=0.25$ nm.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely as illustrative and limited only in scope as specified in the appended claims.

We claim:

1. A magnetic write head, comprising:
   an optical element for providing a thermal gradient in a magnetic recording media, said optical element having an emitting surface; wherein said optical element is a very small aperture laser (VSAL) and,
   a magnetic element for providing a magnetic field gradient in the magnetic recording media, said magnetic element located on said emitting surface.

2. The magnetic write head recited in claim 1, wherein said optical element includes a reflective film structure over the emitting surface, said reflective film structure having a small aperture for emission of laser light.

3. A magnetic write head, comprising:
   a very small aperture laser (VSAL) having an emitting surface; a multilayer thin film structure over the emitting surface, said multilayer thin film structure having a very small aperture for emission of laser light from the VSAL, said multilayer thin film structure comprising:
a reflective conductive layer; and
an insulating layer disposed between the reflective conductive layer and the emitting surface.

4. A magnetic read/write head, comprising:
a write head, including:
   a very small aperture laser (VSAL) having an emitting surface and a side surface;
   a multilayer thin film structure over the emitting surface, said multilayer thin film structure having a very small aperture for emission of laser light from the VSAL, said multilayer thin film structure comprising:
   a reflective conductive layer; and
   an insulatng layer disposed between the reflective conductive layer and the emitting surface.
a read head, including:
   first and second magnetic shield layers;
   first and second nonmagnetic gap layers disposed between said first and second magnetic shield
a magneticoresistive sensor disposed between said first and second nonmagnetic gap layers; and
an interface layer disposed between the read head and the side surface of the VSAL.

5. A disk drive system, comprising:
a magnetic recording disk;
a magnetic read/write head for magnetically recording data on the magnetic recording disk, said magnetic read/write head comprising:
   a magnetic write head, including:
      an optical element for providing a thermal gradient in a magnetic recording media, said optical element having an emitting surface and a side surface wherein said optical element is a very small aperture laser (VSAL); and
      a magnetic element for providing a magnetic field gradient in the magnetic recording media, said magnetic element located on said emitting surface;
   a magnetic read head adjacent to said side surface, said read head including a magnetoresistive sensor;
an actuator for moving said read/write head across the magnetic disk so that the read/write head may access different regions of the magnetic disk; and
a recording channel coupled electrically to the write head for magnetically recording data on the magnetic recording disk and to the magnetoresistive sensor of the read head for detecting changes in the resistance of the magnetoresistive sensor in response to magnetic fields from the magnetically recorded data.

6. The disk drive system recited in claim 5, wherein said optical element includes a reflective film structure over the emitting surface, said reflective film structure having a small aperture for emission of laser light.

7. A method of writing data on a magnetic recording media comprising the steps of:
   a) providing a write head including a magnetic element for providing a magnetic write field gradient and a thermal element for providing a thermal gradient in the magnetic recording media;
   b) providing a thermal spring magnetic recording media having first and second Curie temperatures;
   c) heating a region of the magnetic recording media moving with respect to the write head to a temperature between said first and second Curie temperatures by using light emitted from said thermal element; and
   d) applying a write current to the magnetic element to induce a magnetic write field at the region of the magnetic recording media heated by the thermal element and having a thermal gradient as it cools below said first Curie temperature.

8. The method of writing data recited in claim 7 wherein said magnetic write field provides a magnetic write field gradient coincident with and overlapping the thermal gradient in the magnetic recording media as it cools below said first Curie temperature.

9. The method of writing data recited in claim 7 wherein said thermal gradient is present at a trailing end of the region of magnetic recording media heated by the thermal element as it moves relative to the write head.

10. The method of writing data recited in claim 7 wherein said thermal element comprises a very small aperture laser (VSAL).

11. The method of writing data recited in claim 7 wherein the magnetic element comprises a conductive layer for conducting a write current in a direction perpendicular to the motion of the magnetic recording media relative to the write head.

12. The method of writing data recited in claim 7 wherein the magnetic element comprises a ferromagnetic pole structure for providing a magnetic write field induced by a write current flowing in a conducting coil.

13. The method of writing data recited in claim 7 including the further step of:
   (e) adjusting the intensity of the light emitted from the thermal element to provide coincidence of the thermal gradient with the magnetic write field gradient in the cooling magnetic recording media.

* * * * *